US012455057B1

(12) United States Patent
Pan

(10) Patent No.: US 12,455,057 B1
(45) Date of Patent: Oct. 28, 2025

(54) LED VEHICLE LAMP WITH UNIFORM LIGHT EMISSION

(71) Applicant: Zhuhai Zhengyuan Optoelectronic Technology Co., Ltd., Zhuhai (CN)

(72) Inventor: Dianbo Pan, Zhuhai (CN)

(73) Assignee: ZHUHAI ZHENGYUAN OPTOELECTRONIC TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/207,955

(22) Filed: May 14, 2025

(30) Foreign Application Priority Data

Oct. 11, 2024 (CN) ........................ 202411412745.9

(51) Int. Cl.

| | |
|---|---|
| ***F21S 41/19*** | (2018.01) |
| ***F21S 41/141*** | (2018.01) |
| ***F21S 41/24*** | (2018.01) |
| ***F21S 43/14*** | (2018.01) |
| ***F21S 43/19*** | (2018.01) |
| ***F21S 43/235*** | (2018.01) |
| ***F21S 43/237*** | (2018.01) |
| ***F21S 45/43*** | (2018.01) |
| ***F21S 45/48*** | (2018.01) |
| *F21Y 115/10* | (2016.01) |

(52) U.S. Cl.

CPC ............ *F21S 41/24* (2018.01); *F21S 41/141* (2018.01); *F21S 41/192* (2018.01); *F21S 43/14* (2018.01); *F21S 43/195* (2018.01); *F21S 43/237* (2018.01); *F21S 43/252* (2024.05); *F21S 45/43* (2018.01); *F21S 45/48* (2018.01); *F21Y 2115/10* (2016.08)

(58) Field of Classification Search

CPC ........ F21S 41/24; F21S 43/235; F21S 43/237; F21S 43/243; F21W 2107/10; F21W 2102/00; F21W 2103/00

See application file for complete search history.

(56) References Cited

U.S. PATENT DOCUMENTS

2017/0268740 A1 * 9/2017 Boenigk ............... F21S 41/321
2019/0128496 A1 * 5/2019 Shi .......................... F21S 41/24

FOREIGN PATENT DOCUMENTS

FR 3089309 A1 * 6/2020 ......... G02B 27/0994
JP 3747692 B2 * 2/2006

OTHER PUBLICATIONS

Search English translation of JP-3747692-B2 (Year: 2006).*
Search English translation of FR-3089309-A1 (Year: 2020).*

* cited by examiner

*Primary Examiner* — Omar Rojas Cadima
(74) *Attorney, Agent, or Firm* — Muncy, Geissler, Olds & Lowe, P.C.

(57) ABSTRACT

An LED vehicle lamp with uniform light emission includes a substrate, wherein at least one LED chip is arranged on the substrate, a light guide column is arranged on one side of a light emitting surface of the LED chip, a surface of one end of the light guide column far away from the LED chip is a recessed conical surface, and the recessed conical surface is recessed towards the LED chip; one end of the light guide column far away from the LED chip is a first end in a truncated cone shape, only a part of the first end of the light guide column is provided with a first electroplated area, the first electroplated area is arranged close to the LED chip, and the recessed conical surface is provided with a second electroplated area.

9 Claims, 5 Drawing Sheets

LED VEHICLE LAMP WITH UNIFORM LIGHT EMISSION

TECHNICAL FIELD

The present invention relates to the field of automobile accessories, and specifically, to an LED vehicle lamp with uniform light emission.

BACKGROUND

A light emitting diode (LED) vehicle lamp has the characteristics of low voltage, long service life, instant lighting and neutral light emission, and has significant advantages over the current mainstream halogen lamps and high intensity discharge (HID) lamps in vehicle lamping. Due to higher driving safety, LED vehicle lamps have been widely used in vehicle lamps.

However, most of the LED vehicle lamps on the market currently emit light from two sides, which leaves some dark spots. Some LED vehicle lamps emit light from four sides. Moreover, these LED vehicle lamps all have the problem of a large light point size, a high light intensity at the center of the light point, but uneven light intensity around the light point, which cannot be compared with halogen lamps.

SUMMARY

An objective of the present invention is to provide an LED vehicle lamp with uniform light emission, so as to solve uneven light emission of existing LED vehicle lamps.

To achieve the objective of the present invention, an LED vehicle lamp with uniform light emission provided by the present invention includes a substrate, wherein at least one LED chip is arranged on the substrate, a light guide column is arranged on one side of a light emitting surface of the LED chip, a surface of one end of the light guide column far away from the LED chip is a recessed conical surface, and the recessed conical surface is recessed towards the LED chip; one end of the light guide column far away from the LED chip is a first end, the first end of the light guide column is a truncated cone, an included angle between a generatrix of a truncated cone body of the first end of the light guide column and an axis is (5°, 6°], only a part of the first end of the light guide column is provided with a first electroplated area, the first electroplated area is arranged close to the LED chip, and the recessed conical surface is provided with a second electroplated area.

It may be seen from the foregoing solution that, the light guide column of the LED vehicle lamp of the present invention is provided with a truncated cone structure with a certain inclination, so that after the light is reflected multiple times by the truncated cone structure, the reflection angle gradually decreases, and when reaching a part where the first electroplated area is not provided, the light may be emitted in a direction close to the horizontal direction. The provision of the first electroplated area not only ensures the total reflection of the light, but also forces the light that does not meet the total reflection due to a chamfer in a range of (5°, 6°] to undergo specular reflection until the light is emitted horizontally from the top of the first electroplated area. This effectively shortens the length of the light-emitting area and reduces the size of the light-emitting area (closer to the light-emitting size of halogen filaments and HID), meeting the light distribution requirements of the lamp and obtaining better light distribution data. The included angle between the generatrix of the truncated cone body and the axis is in a range of (5°, 6°], which ensures that an incident angle of the light contacting the first end of the light guide column (i.e., the truncated cone structure) is not less than a critical angle at least once, and total reflection can be achieved. The subsequent provision of the first electroplated area ensures that the light continues to undergo total reflection in the subsequent reflection process and the reflection angle continues to decrease until the light reaches a part where first electroplated area is not provided, so that the light can be emitted nearly horizontally. An excessively large tilt angle is prevented. The excessively large tilt angle causes the incident angle of the light contacting the light guide column to be less than the critical angle, preventing total reflection and thus affecting the final light emission efficiency of the LED vehicle lamp. In addition, an excessively small tilt angle should also be avoided. To ensure that the light is emitted nearly horizontally, the height of the light guide column is too large and exceeds a focal length of the lamp design, which increases the size of the LED vehicle lamp and affects the light emission effect of the LED vehicle lamp. The recessed conical surface is provided with the second electroplated area, so that light is reflected by the recessed conical surface and is irradiated to the lateral rear side or the horizontal direction, and light spots are more uniform and emit light uniformly by 360°, which effectively improves the light distribution efficiency of the vehicle lamp and effectively avoids the dazzling of high brightness in the front of the LED vehicle lamp. The truncated cone structure of the first electroplated area and the recessed conical surface of the second electroplated area are provided to achieve light redistribution, so that the light is evenly distributed, thereby achieving that the LED vehicle lamp emits light evenly within the effective light-emitting angle without dark spots and shadow areas. In addition, the foregoing structure changes the larger surface light source of the LED chip into a smaller point-like light source, thereby avoiding the light dispersion and poor light distribution effect caused by overlarge light emitting size.

In a further embodiment, a first electroplated part is sleeved outside the light guide column, a part of the first end of the light guide column is exposed out of the first electroplated part, and an area where the light guide column is built into the first electroplated part is the first electroplated area; a second electroplated part is arranged on the recessed conical surface, one end of the second electroplated part close to the recessed conical surface is a first end of the second electroplated part, and the first end of the second electroplated part is attached to the recessed conical surface to form the second electroplated area.

It may be seen from the foregoing solution that, the provision of the first electroplated part and the second electroplated part greatly reduces the process difficulty and cost of directly performing local electroplating treatment on the recessed conical surface and the outside of the light guide column, and the first electroplated part and the second electroplated part are simple in structure and more convenient to use.

In a further embodiment, the light guide column includes a first light guide member and a second light guide member that are attached to each other, and the first light guide member and the second light guide member are made of light-transmitting materials; the first light guide member is closer to the LED chip than the second light guide member, the first light guide member is cylindrical, the second light guide member is truncated cone-shaped, and one end of the second light guide member close to the first light guide member is positioned in the first electroplated part.

In a further embodiment, at least a part of the first light guide member extends into the first electroplated part.

It may be seen from the foregoing solution that, the provision of the first light guide member and the second light guide member enables the mounting of the light guide column more convenient and the preparation process simpler.

In a further embodiment, the recessed conical surface is inverted triangle in longitudinal section, and a vertex of the inverted triangle is between 72° and 74°.

It may be seen from the foregoing solution that, the vertex angle is set between 72° and 74°, which avoids the situation where the light returns to the light guide column after being reflected by the recessed conical surface and cannot be transmitted out, thereby improving the light utilization rate.

In a further embodiment, the LED vehicle lamp further includes a shell, a first through hole is provided in the shell, a part of the first end of the light guide column not provided with the first electroplated area is positioned in the first through hole, and the shell parts at two sides of the first through hole are made of light-transmitting materials.

It may be seen from the foregoing solution that, the provision of the shell plays a good protective role on the LED vehicle lamp and ensures the service life of the LED vehicle lamp. The shell parts at two sides of the first through hole are made of light-transmitting materials to ensure 360° uniform light emission.

In a further embodiment, the shell includes an upper shell and a lower shell, and the upper shell and the lower shell are connected with each other; the first through hole is arranged on the upper shell, the upper shell includes a second through hole, and the light guide column extends into the upper shell via the second through hole; and the second end of the light guide column, the substrate and the LED chip are all positioned in the lower shell.

It may be seen from the foregoing solution that, the shell includes an upper shell and a lower shell, which enables the mounting of the LED vehicle lamp more convenient.

In a further embodiment, a chuck is sleeved outside the shell.

In a further embodiment, the LED vehicle lamp further includes a power supply assembly, the power supply assembly includes a drive board and a power supply connector, the power supply connector includes a power supply pin, and the drive board is electrically connected to the power supply connector; and the drive board is electrically connected to the substrate by the mounting column.

In a further embodiment, the LED vehicle lamp further includes a heat dissipation assembly, the heat dissipation assembly includes a fan, and the heat dissipation assembly is electrically connected to the substrate.

It may be seen from the foregoing solution that, the provision of the chuck, the power supply assembly and the heat dissipation assembly ensures the normal operation of the LED vehicle lamp. Meanwhile, the LED is closer to the heat dissipation assembly and the fan, so that the heat dissipation effect of the LED vehicle lamp is ensured.

The present invention is further described below in conjunction with the accompanying drawings and embodiments.

DETAILED DESCRIPTION OF EMBODIMENTS

Referring to FIGS. 1 to 9, the LED vehicle lamp with uniform light emission provided by this embodiment includes a shell, a heat dissipation assembly, a power supply assembly, a substrate 5, an LED chip set 6 and a light guide column are arranged in the shell, and a chuck 10 is sleeved outside the shell.

Referring to FIGS. 2 to 7, the LED chip set 6 is arranged on the substrate 5, and the LED chip set 6 includes at least one LED chip. In this embodiment, the LED chip set 6 includes 9 LED chips.

Figure 6:
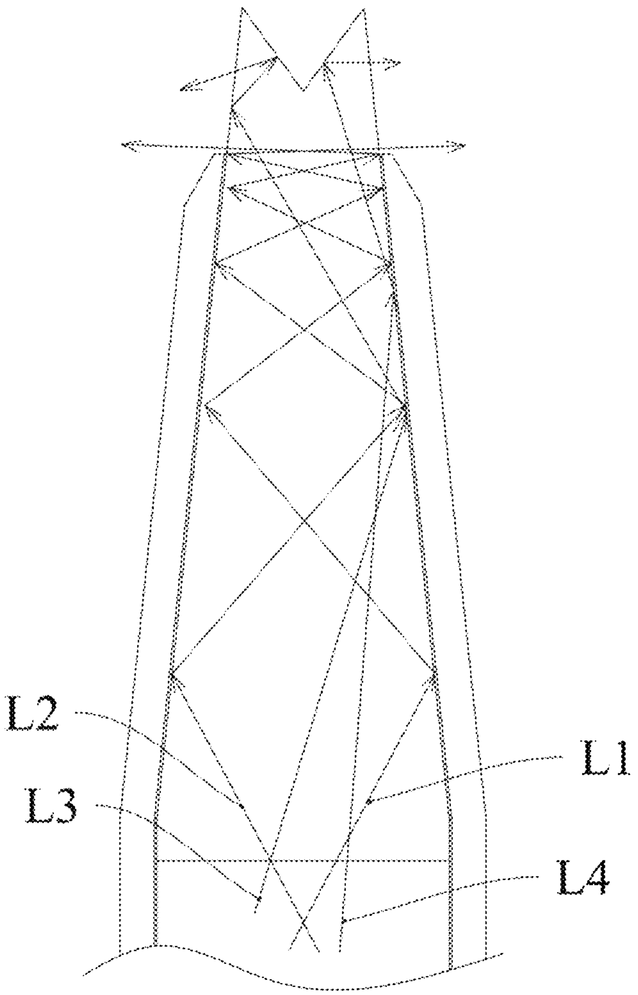
FIG. 6 is a light path diagram of light propagating in a light guide column according to the present invention.
Figure 7:
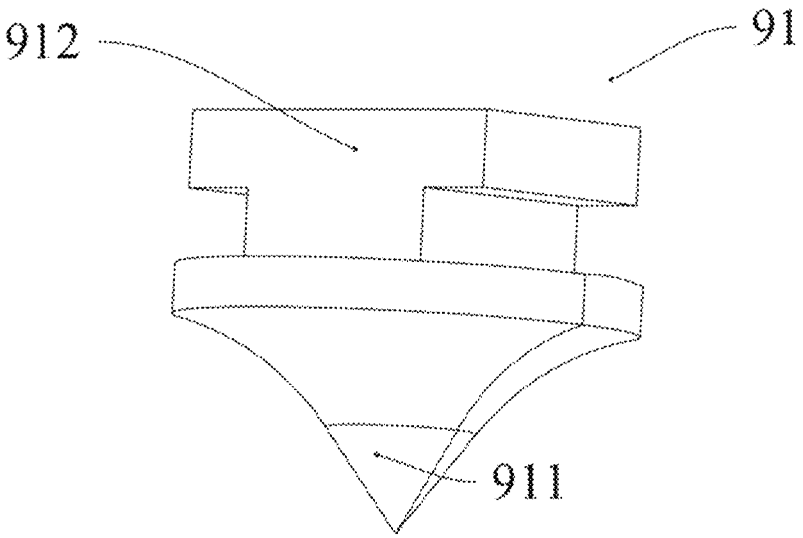
FIG. 7 is a structural diagram of a second electroplated part according to the present invention.
Figure 8:
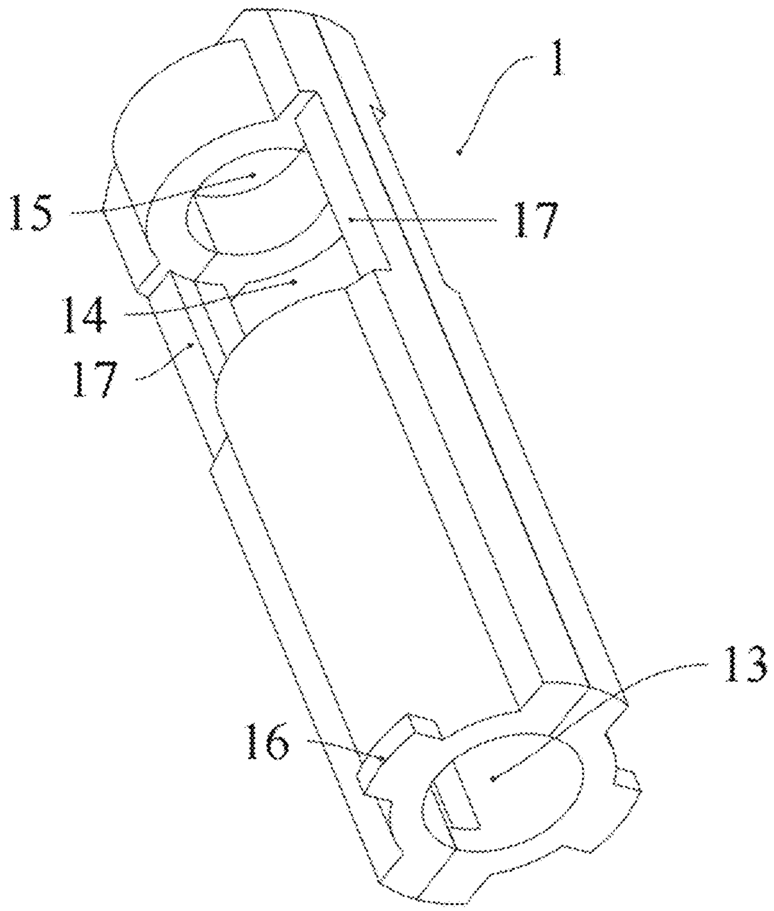
FIG. 8 is a structural diagram of an upper shell according to the present invention.
Figure 9:
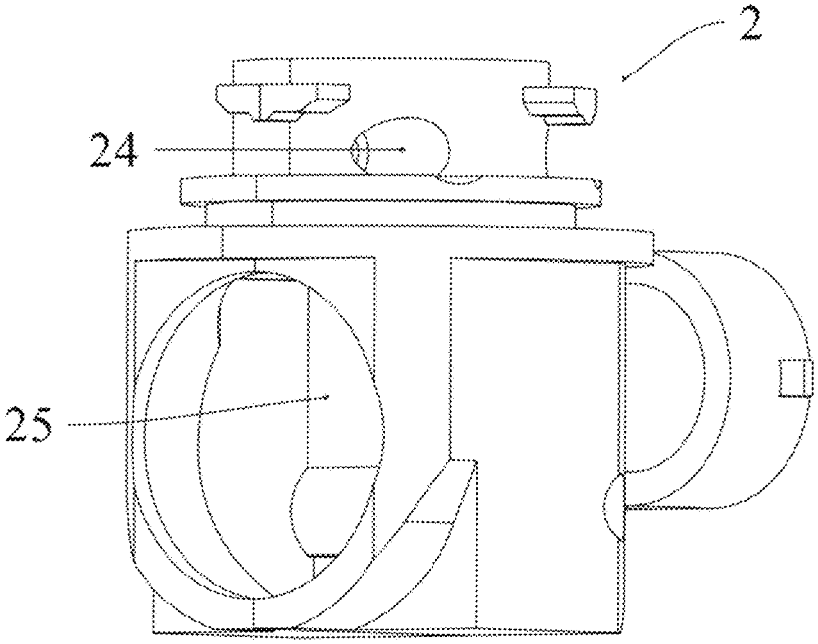
FIG. 9 is a structural diagram of a lower shell according to the present invention.

A light guide column is arranged on one side of a light emitting surface of the LED chip set 6, a surface of one end of the light guide column far away from the LED chip set 6 is a recessed conical surface 81, and the recessed conical surface 81 is recessed towards the LED chip set 6; one end of the light guide column far away from the LED chip set 6 is a first end, the first end of the light guide column is a truncated cone, an included angle between a generatrix of a truncated cone body of the first end of the light guide column and an axis is (5°, 6°], only a part of the first end of the light guide column is provided with a first electroplated area, the first electroplated area is arranged close to the LED chip, and the recessed conical surface 81 is provided with a second electroplated area. Referring to FIG. 6, the first end of the light guide column is set as a truncated cone structure with a certain inclination. After the light L1 and the light L2 are reflected by a side wall of the truncated cone a plurality of times, the reflection angle gradually decreases until the light reaches a part where first electroplated area is not provided, and nearly horizontal transmission may be achieved. The first electroplated area is provided to ensure total reflection of light. Due to the provision of the truncated cone structure, the incident angle becomes smaller and smaller after a plurality of reflections. Once the incident angle is less than the critical angle, the light no longer undergoes total reflection but is transmitted. With the provision of the first electroplated area, the light is forced to undergo total reflection, so that after a plurality of reflections, the reflection angle of the light gradually decreases until the light is nearly horizontal (the reflection angle is about) 6°), and the first electroplated area is no longer provided, thus achieving the effect of nearly horizontal light emission. The included angle between the generatrix of the truncated cone body and the axis is in a range of (5°, 6°], which ensures that an incident angle of the light contacting the first end of the light guide column (i.e., the truncated cone structure) is not less than a critical angle at least once, and total reflection can be achieved. The subsequent provision of the first electroplated area ensures that the light continues to undergo total reflection in the subsequent reflection process and the reflection angle continues to decrease until the light reaches an area where the first electroplated area is not provided, so that the light can be emitted nearly horizontally. An excessively large tilt angle is prevented. The excessively large tilt angle causes the incident angle of the light contacting the light guide column to be less than the critical angle, preventing total reflection and thus affecting the final light emission efficiency of the LED vehicle lamp. In addition, an excessively small tilt angle should also be avoided. To ensure that the light is emitted nearly horizontally, the height of the light guide column is too large, which increases the size of the LED vehicle lamp and affects the light emission effect of the LED vehicle lamp. The recessed conical surface 81 is provided with the second electroplated area, so that light L3 and the light L4 are reflected by the recessed conical surface 81 and are irradiated to the lateral rear side or the horizontal direction, and light spots are more uniform, which effectively improves the light distribution efficiency of the vehicle lamp and effectively avoids the dazzling of high brightness in the front of the LED vehicle lamp.

In this embodiment, the light guide column includes a first light guide member 7 and a second light guide member 8 that are attached to each other, wherein the first light guide member 7 is closer to the LED chip set 6 than the second light guide member 8, at least the second light guide member 8 is made of a light-transmitting material, the first light guide member 7 is made of a cylindrical light-transmitting material, the second light guide member 8 is in a truncated cone shape, and an included angle α between a generatrix of the truncated cone and an axis is (5°, 6°]. In this embodiment, the included angle α between the generatrix of the truncated cone and the axis is 6°, and the recessed conical surface 81 is arranged at one end of the second light guide member 8 far away from the first light guide member 7.

The first electroplated area and the second electroplated area may be formed by local electroplating or by other processes. Specifically, in this embodiment, outer walls of the first light guide member 7 and the second light guide member 8 are sleeved on the first electroplated part 92. Specifically, one end of the first light guide member 7 far away from the LED chip set 6 extends into the first electroplated part 92, one end of the second light guide member 8 close to the first light guide member 7 extends into the first electroplated part 92, and a part of the second light guide member 8 is exposed out of the first electroplated part 92. An area where the second light guide member 8 and the first light guide member 7 are built into the first electroplated part 92 is the first electroplated area, and the first light guide member 7 and the second light guide member 8 are seamlessly connected and fixed. The second electroplated part 91 is arranged on the recessed conical surface 81, the second electroplated part 91 includes a first end 911 and a second end 912, and the first end 911 of the second electroplated part 91 is attached to the recessed conical surface 81 to form a second electroplated area. The provision of the first electroplated part 92 and the second electroplated part 91 greatly reduces the process difficulty and cost of directly performing local electroplating treatment on the recessed conical surface 81 and the outside of the light guide column, and the first electroplated part 92 and the second electroplated part 91 are simple in structure, more convenient to use and low in batch production cost. Of course, the first light guide member 7 and the second light guide member 8 may be integrated.

Figure 1:
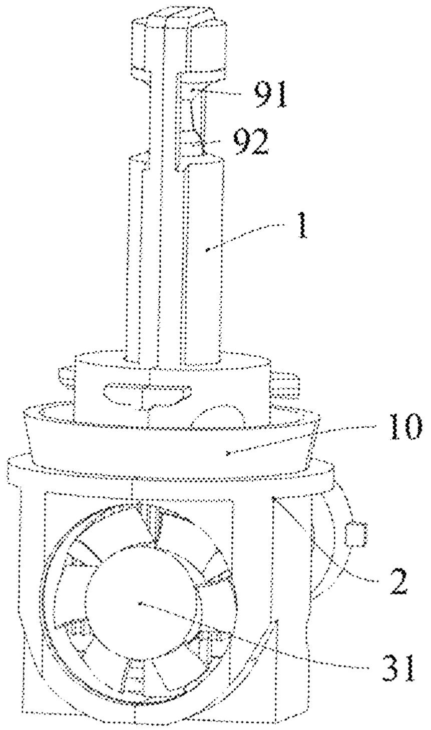
FIG. 1 is a structural diagram of an LED vehicle lamp with uniform light emission according to the present invention.
Figure 2:
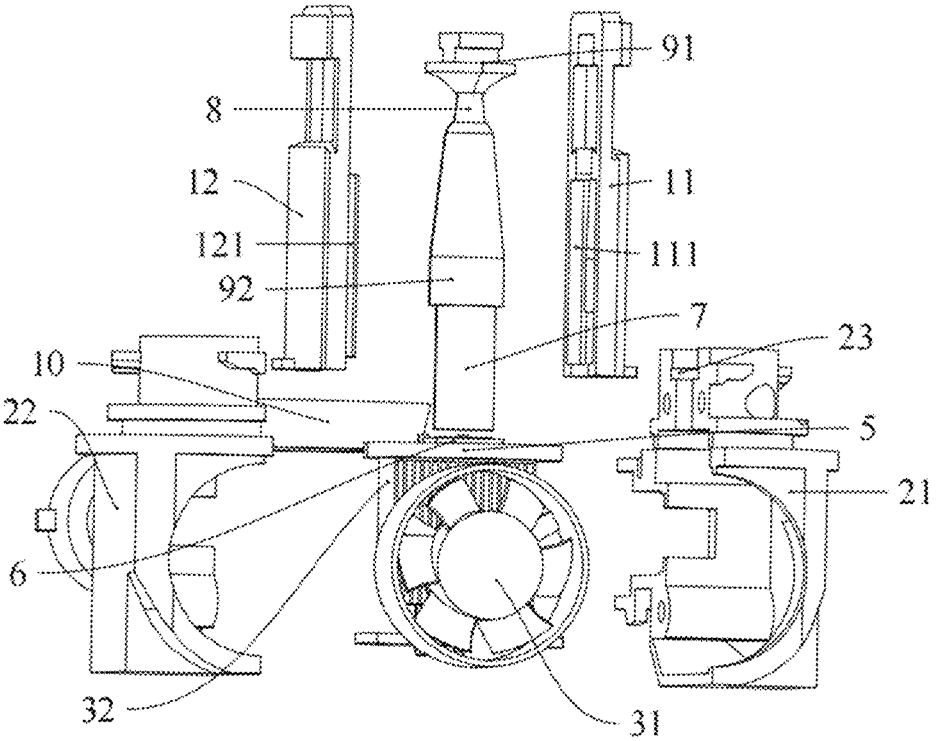
FIG. 2 is a structural exploded view of an LED vehicle lamp with uniform light emission according to the present invention.
Figure 3:
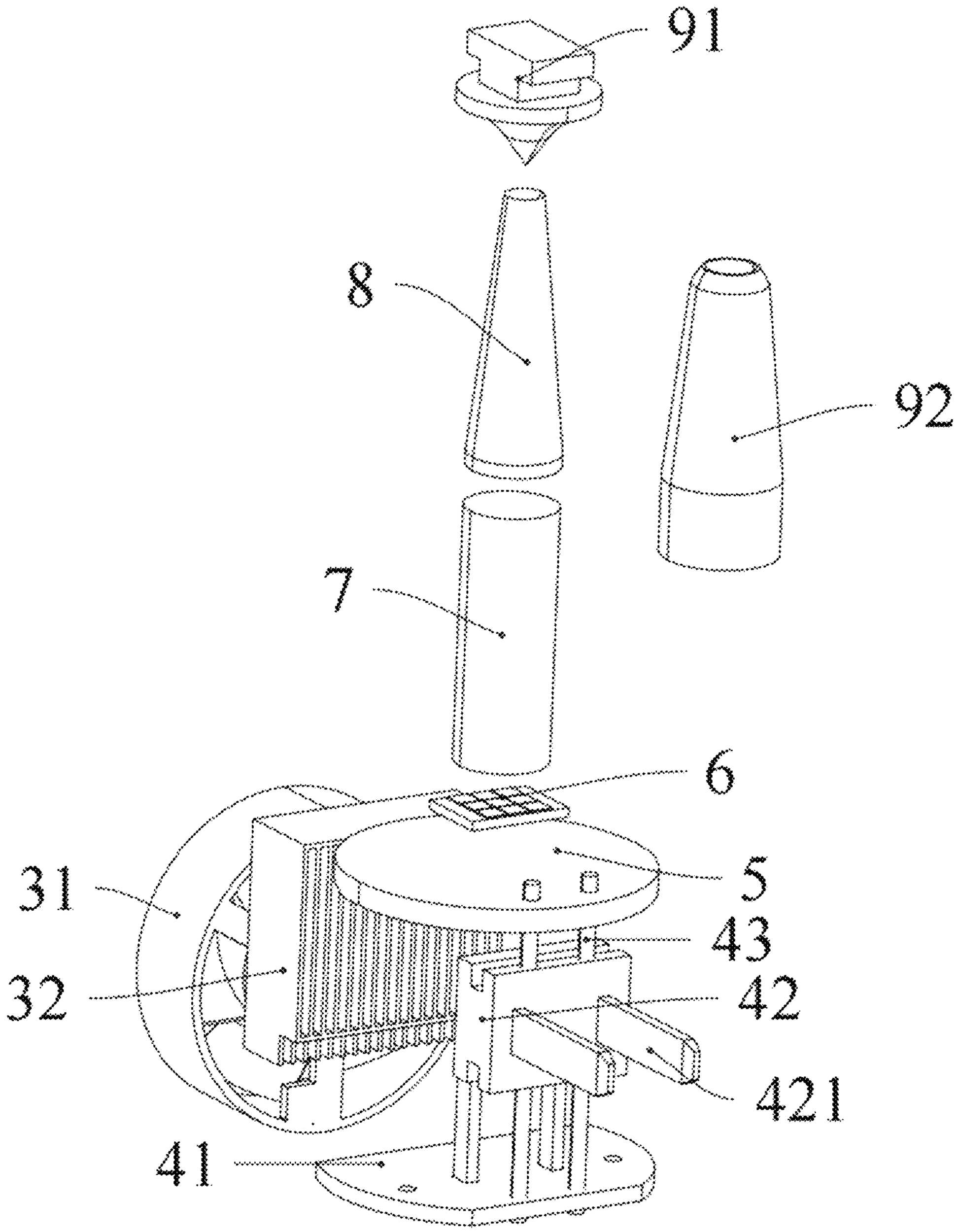
FIG. 3 is a structural exploded view of a hidden shell of an LED vehicle lamp with uniform light emission according to the present invention.
Figure 4:
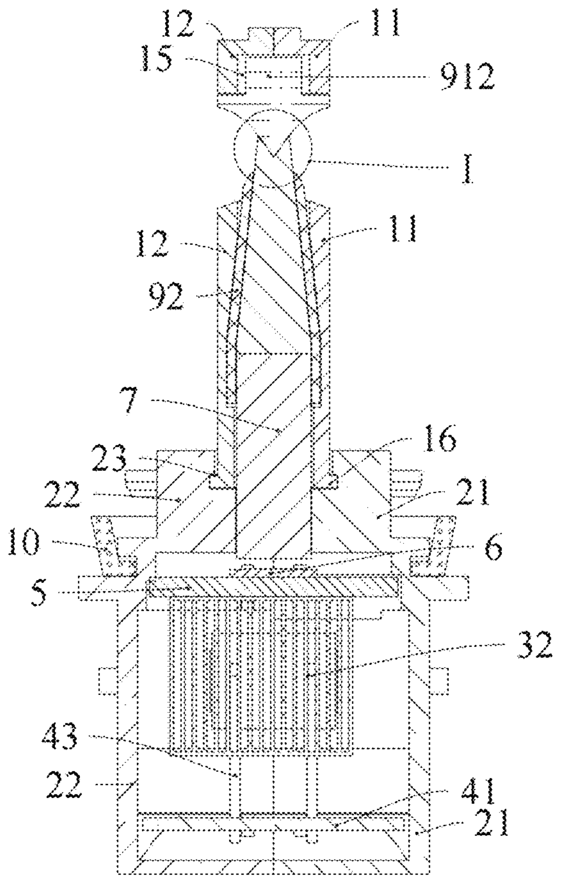
FIG. 4 is a cross-sectional view of an LED vehicle lamp with uniform light emission according to the present invention.
Figure 5:
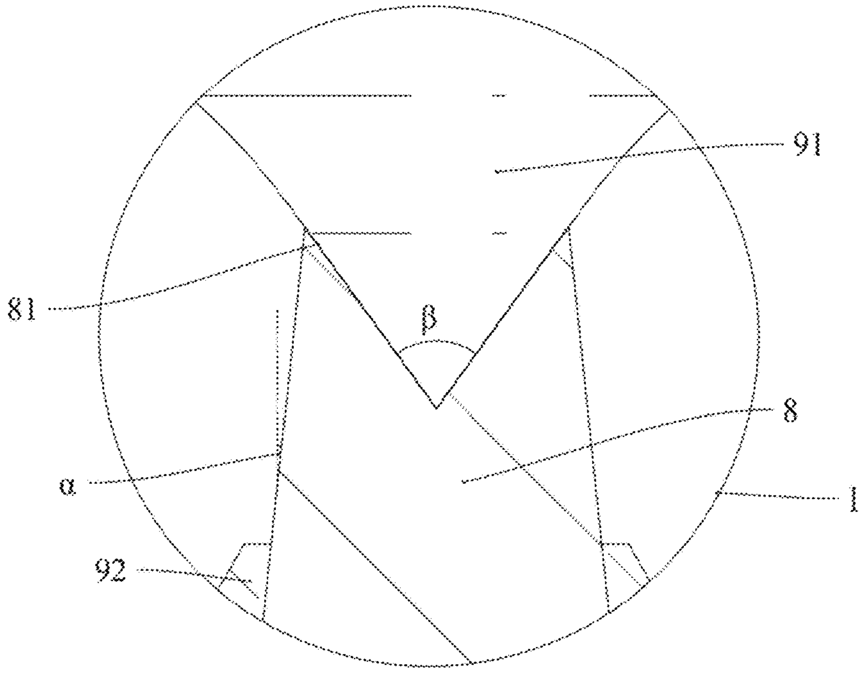
FIG. 5 is an enlarged view of I in FIG. 4.

Referring to FIG. 5, in this embodiment, the recessed conical surface 81 is inverted triangle in longitudinal section, and a vertex β of the inverted triangle is between 72° and 74°. In this embodiment, the apex β is 72°. This angle avoids the situation where the light returns to the light guide column after being reflected by the recessed conical surface 81 and cannot be transmitted out by the light guide column, so that the light emitted by the LED chip set 6 is effectively utilized, and the light emission efficiency is higher.

Referring to FIGS. 1 to 9, in this embodiment, the shell includes an upper shell 1 and a lower shell 2, and a chuck 10 is sleeved on the lower shell 2. A first protrusion 16 is provided on an outer wall of the upper shell 1, a first groove 23 is provided on an inner peripheral wall of the lower shell 2, the first protrusion 16 and the first groove 23 match each other, and the upper shell 1 and the lower shell 2 are connected to each other by the first protrusion 16 and the first groove 23. Specifically, the upper shell 1 includes a first shell 11 and a second shell 12, the first shell 11 is provided with a second groove 111, and the second shell 12 is provided with a second protrusion 121 for limiting to achieve that the first shell 11 and the second shell 12 are spliced to form the upper shell 1. The lower shell 2 includes a third shell 21 and a fourth shell 22, the lower shell 2 is provided with screw holes 24 to achieve splicing between the third shell 21 and the fourth shell 22, and further achieve splicing between the first shell 11 and the second shell 12.

The upper shell 1 is provided with a first through hole 13, a second through hole 14 and a third groove 15, an area of the second light guide member 8 exposed out of the first electroplated part 92 is positioned in the first through hole 13, and the shell parts 17 at two sides of the first through hole 13 are made of light-transmitting materials. The light guide column and the first electroplated part 92 extend into the upper shell 1 via the second through hole 14, and a second end 912 of the second electroplated part 91 is positioned in the third groove 15. One end of the first light guide member 7 close to the LED chip set 6, the substrate 5 and the LED chip set 6 are all positioned in the lower shell 2.

The lower shell 2 is provided with a cavity 25, and a heat dissipation assembly and a power supply assembly are provided in the cavity 25. The power supply assembly includes a drive board 41 and a power supply connector 42, the power supply connector 42 includes a power supply pin 421, and the LED vehicle lamp is electrified by the power supply pin 421. The drive board 41 is electrically connected to the power supply connector 42; and the drive board 41 and the substrate 5 are electrically connected by a mounting column 43. The heat dissipation assembly includes a fan 31 and a fin-shaped heat dissipation body 32, the heat dissipation assembly is electrically connected to the substrate, and the fan 31 is in communication with the external air. The heat dissipation assembly is closer to the LED chip set 6, and the heat dissipation effect is better, which solves the problem of heat dissipation effect caused by the light source being far away from the heat dissipation structure in the existing LED vehicle lamp.

According to the LED vehicle lamp in this embodiment, the truncated cone structure of the first electroplated area and the recessed conical surface 81 of the second electroplated area are provided to achieve light redistribution, so that the light is evenly distributed, thereby achieving that the LED vehicle lamp emits light evenly within the effective light-emitting angle without dark spots and shadow areas. The foregoing structure changes the larger surface light source of the LED chip into a smaller point-like light source, thereby avoiding the light dispersion and poor light distribution effect of the lamp caused by overlarge light emitting size. Meanwhile, the first electroplated area and the second electroplated area are formed by the first electroplated part 92 and the second electroplated part 91, which greatly reduces the process difficulty and cost of directly performing local electroplating treatment on the recessed conical surface and the outside of the light guide column. In addition, the first electroplated part and the second electroplated part are simple in structure and more convenient to use.

Finally, it should be emphasized that the above mentioned contents are only preferred embodiments of the present invention and are not intended to limit the present invention. For those skilled in the art, the present invention may have various changes and modifications. Any modifications, equivalent replacements, improvements, and the like made within the spirit and principles of the present invention should be included in the protection scope of the present invention.

The invention claimed is:

1. An LED vehicle lamp with uniform light emission, comprising:

a substrate, wherein at least one LED chip is arranged on the substrate, a light guide column is arranged on one side of a light emitting surface of the LED chip, a surface of one end of the light guide column far away from the LED chip is a recessed conical surface, and the recessed conical surface is recessed towards the LED chip;

wherein one end of the light guide column far away from the LED chip is a first end, the first end of the light guide column is a truncated cone, and an included angle between a generatrix of a truncated cone body of the first end of the light guide column and an axis is (5°, 6°];

only a part of the first end of the light guide column is provided with a first electroplated area, and the first electroplated area is arranged close to the LED chip; and the recessed conical surface is provided with a second electroplated area;

the LED vehicle lamp further comprises a shell, a first through hole is provided in the shell, a part of the first end of the light guide column not provided with the first electroplated area is positioned in the first through hole, and shell parts at two sides of the first through hole are made of light-transmitting materials.

2. The LED vehicle lamp with uniform light emission according to claim 1, wherein the first electroplated part is sleeved outside the light guide column, a part of the first end of the light guide column is exposed out of the first electroplated part, and an area where the light guide column is built into the first electroplated part is the first electroplated area; and the second electroplated part is arranged on the recessed conical surface, one end of the second electroplated part close to the recessed conical surface is a first end of the second electroplated part, and the first end of the second electroplated part is attached to the recessed conical surface to form the second electroplated area.

3. The LED vehicle lamp with uniform light emission according to claim 2, wherein the light guide column comprises a first light guide member and a second light guide member that are attached to each other, and the first light guide member and the second light guide member are made of light-transmitting materials; and the first light guide member is closer to the LED chip than the second light guide member, the first light guide member is cylindrical, the second light guide member is truncated cone-shaped, and one end of the second light guide member close to the first light guide member is positioned in the first electroplated part.

4. The LED vehicle lamp with uniform light emission according to claim 3, wherein at least a part of the first light guide member extends into the first electroplated part.

5. The LED vehicle lamp with uniform light emission according to claim 1, wherein the recessed conical surface is inverted triangle in longitudinal section, and a vertex of the inverted triangle is between 72° and 74°.

6. The LED vehicle lamp with uniform light emission according to claim 1, wherein the shell comprises an upper shell and a lower shell, and the upper shell and the lower shell are connected to each other;

the first through hole is arranged in the upper shell, the upper shell comprises a second through hole, and the light guide column extends into the upper shell via the second through hole; and a second end of the light guide column, the substrate and the LED chip are all positioned in the lower shell.

7. The LED vehicle lamp with uniform light emission according to claim 1, wherein a chuck is sleeved outside the shell.

8. The LED vehicle lamp with uniform light emission according to claim 1, wherein the LED vehicle lamp further comprises a power supply assembly, the power supply assembly comprises a drive board and a power supply connector, the power supply connector comprises a power supply pin, and the drive board is electrically connected to the power supply connector; and the drive board is electrically connected to the substrate by a mounting column.

9. The LED vehicle lamp with uniform light emission according to claim 1, wherein the LED vehicle lamp further comprises a heat dissipation assembly, the heat dissipation assembly comprises a fan, and the heat dissipation assembly is electrically connected to the substrate.

* * * * *